Feb. 2, 1971     D. W. PALACHIK     3,560,118
ROTARY MOTOR OR PUMP
Filed June 11, 1969     5 Sheets-Sheet 1

Inventor
Derso W. Palachik
by: Cecil C. Kent.

Feb. 2, 1971  D. W. PALACHIK  3,560,118
ROTARY MOTOR OR PUMP
Filed June 11, 1969  5 Sheets-Sheet 3

Inventor
Derso W. Palachik
by: Cecil C. Kent

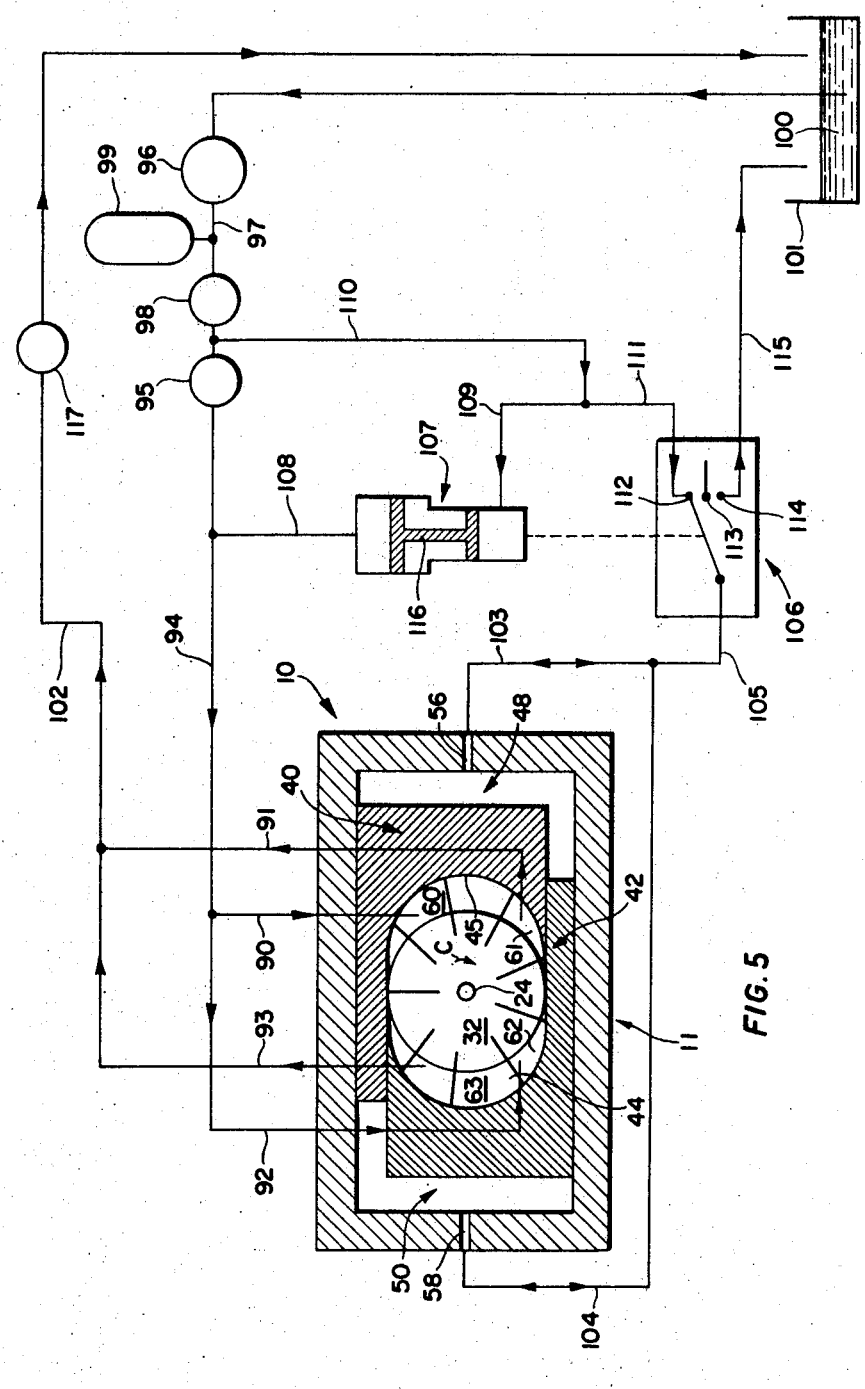

United States Patent Office 3,560,118
Patented Feb. 2, 1971

3,560,118
ROTARY MOTOR OR PUMP
Derso W. Palachik, 16 Bridlington St.,
Scarborough 722, Ontario, Canada
Filed June 11, 1969, Ser. No. 832,085
Int. Cl. F01c 21/16
U.S. Cl. 418—26   14 Claims

ABSTRACT OF THE DISCLOSURE

A deformable stator formed of opposed essentially semi-circular linearly movable sections having overlapping extensions on either side of a radially vaned rotor enclosure a pair of variable volume meniscoidal stator chamber sections whereby a fluid pressure unit is provided utilizable either as a hydraulic motor capable of variable torque output or a pump of predetermined pressure output responsive to automatic control of its volumetric displacement rate.

---

The present invention relates to fluid pressure units and to fluid pressure systems. More particularly, the invention relates to fluid pressure units of the type which incorporate a deformable stator member defining a stator chamber itself containing a motor having a number of angularly disposed and radially extending vanes.

Fluid pressure units having deformable stators have already been described. These units may be operated as pressure-actuated motors or as hydraulic pumps. Many of the known units are provided with deformable stator rings so that the eccentricity of the stator chamber of such a unit, and consequently the torque output of the motor or the volume displacement rate of he pump can be varied. Other known units of this type have incorporated relatively complex mechanical systems for controlling the shapes and volumes of their stator chambers.

It is a principal object of the present invention to provide a fluid pressure unit of the aforementioned type in which a stator chamber of variable eccentricity and volume is provided in an especially simple and reliable manner.

It is another object of the invention to provide a fluid pressure unit of the aforementioned type which unit can be utilized either as a hydraulic motor or as a hydraulic pump.

Yet another object of the invention is to provide hydraulic motors adapted to provide a variable torque output and hydraulic pumps having a predetermined pressure output by automatic control of their volume displacement rates.

These and other objects are achieved in accordance with the present invention by the provision of a fluid pressure unit comprising a housing, a pair of axially separated sidewalls, a generally cylindrical rotor journalled in said sidewalls and having a plurality of circumferentially spaced apart vanes movably received within corresponding slots extending generally radially inwardly from the periphery of said rotor, and a pair of stator members each slidably disposed in mutually overlapping relationship within said housing with respect to each other between said sidewalls to define a stator chamber having an inner continuous cam surface containing said rotor, said cam surface being engaged terminally by said vanes and said stator members defining with said housing diametrically opposed control chambers adapted to receive fluid under pressure for the purpose of controlling the relative positions of said stator members and in turn the eccentricity and volume of said stator chamber, and ports for the supply and discharge of fluid to and from said stator chamber, said ports being spaced apart sufficiently to be isolated from one another by said vanes.

The fluid pressure units of the present invention have led to the development of a novel fluid pressure system which broadly comprises a source of pressurized fluid at a predetermined pressure, a fluid pressure unit comprising a generally cylindrical rotor journalled in a housing and having a plurality of circumferentially spaced apart vanes movably received within corresponding slots extending generally radially inwardly from the periphery of said rotor, a deformable stator defining a stator chamber having an inner cam surface and containing said rotor, said cam surface being engaged terminally by said vanes, a supply port for the supply of fluid from said source to said stator chamber and a discharge port for the discharge of fluid from said stator chamber, said supply port and said discharge port being spaced apart sufficiently to be isolated from one another by said vanes, and at least one fluid pressure control chamber in external pressure communication with said deformable stator whereby the eccentricity of said stator chamber is varied in dependence on the fluid pressure existing in said control chamber, sensing means for sensing the pressure at one port selected from said supply port and said discharge port, and control means associated with said sensing means for controlling the supply of pressurized fluid from said source to said control chamber and out of said control chamber in accordance with the value of said pressure at said one port whereby the eccentricity of said stator chamber is automatically adjusted so as to maintain a predetermined pressure at said one port.

The use of the systems of the invention together with hydraulic motors and pumps and particularly with the fluid pressure units of the invention will be described in greater detail hereinafter.

The fluid pressure units of the present invention will have considerable usefulness in a wide range of applications. Their relatively simple construction and their relatively small size make them particularly suitable for mounting as individual drive units within the wheels of large and small vehicles. They may, for instance, be used in motorcycles, automobiles and heavy construction and forestry vehicles, and in military vehicles.

Other uses for the units of the invention will be apparent to those conversant with the relevant technologies. Other objects, advantages and features of the invention will become apparent as the description herein proceeds.

With the foregoing objects in view, and such other or further purposes, advantages or novel features as may become apparent from consideration of this disclosure and specification, the present invention consists of the inventive concept which is comprised, embodied, embraced, or included in the method, process, construction, composition, arrangement or combination of parts, or new use of any of the foregoing, herein exemplified in one or more specific embodiments of such concept, reference being had to the accompanying figures in which.

Figure 1:
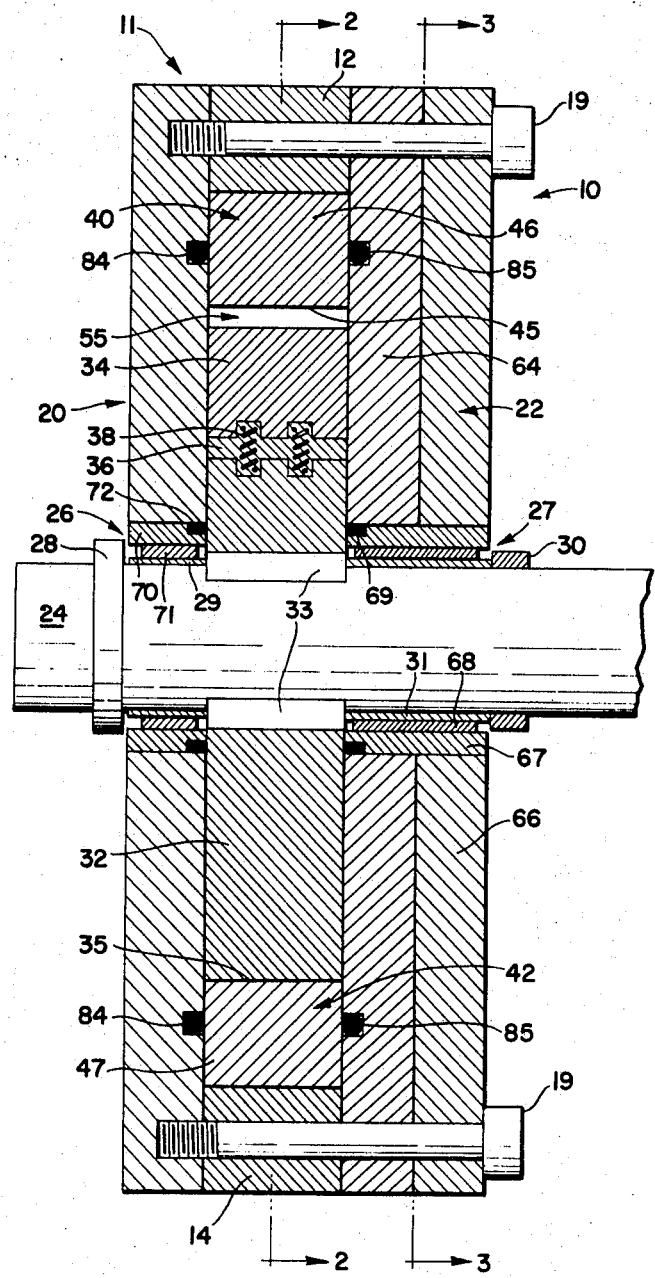
FIG. 1 is an axial section through a particularly useful embodiment of a fluid pressure unit in accordance with the invention.

FIG. 5 is a somewhat schematic diagram of one embodiment of a fluid pressure system in accordance with the invention and incorporating therein as a hydraulic motor the hydraulic fluid unit of FIGS. 1 to 4. In the drawings, like characters of reference designate similar parts in the several figures. Referring first to FIGS. 1 to 4, the fluid pressure unit 10 illustrated therein will now be described with reference to its use as a hydraulic motor. As will be explained in greater detail hereinafter, the unit 10 can also be used as a hydraulic pump.

The unit 10 comprises a hollow, generally rectangular housing generally indicated at 11 and having upper and lower parallel members 12 and 14 respectively and mutually parallel end members 16 and 18. Axially separated sidewalls indicated generally at 20 and 22 are secured to the housing, for example, by bolts 19. Although the housing 11 has been illustrated as having a rectangular configuration, it will readily be appreciated that the housing may have any other desired external shape. A rotor having a shaft 24 is journalled in the sidewalls 20 and 22 usefully by means of roller bearings indicated generally at 26 and 27 respectively and having inner races 29 and 31 respectively. The shaft 24 is retained in a desired axial position by an integrally formed annular flange 28 externally engaging the inner race 29 of the bearing 26 and by a coaxial locking ring 30 externally engaging the inner race 31 of the bearing 27.

The rotor shaft 24 is keyed as at 33 to a generally cylindrical rotor body 32 disposed between the sidewalls 20 and 22 and having a plurality of circumferentially spaced apart vanes 34 movably received within corresponding slots 36 extending generally radially inwardly from the periphery 35 of the rotor body 32. It is to be noted that, in the particular unit 10 shown in the drawings, each vane 34 is urged radially outwardly by a pair of helical compression springs 38 disposed within its slot 36 radially inwardly of the vane 34. It will frequently be advantageous for a reason which will subsequently be explained to provide the units of the invention with an odd (i.e. uneven) number of vanes.

Further reference to FIG. 1 will show that the unit 10 also comprises a pair of stator members 40 and 42 which are each slidably disposed in mutually overlapping relationship for movement in the directions of the arrows A and B (FIG. 2) within the housing 11 between the sidewalls 20 and 22 to define a stator chamber generally indicated at 44, having an inner continuous cam surface generally indicated at 45, and containing the rotor body 32. It will be seen from FIG. 2 that the vanes 34 are urged by springs 38 into terminal engagement with the cam surface 45.

In the particular unit 10, each stator member 40, 42 comprises an end section 41, 43 respectively having a generally semicircular, inner surface forming part of the cam surface 45, and a parallel sided, leg portion 46, 47 respectively disposed slidably along the inner surface of the upper and lower members 12, 14 respectively. The stator members 40 and 42 also define with the housing 11 diametrically opposed control chambers 48 and 50. In particular, it is to be noted that the chamber 48 is bounded by outer surface 51 of the end section 41 of the stator member 40, end surface 52 of the leg portion 47 of the stator member 42, and the inner surface of the end member 18 of the housing 11, and by the exposed portions of the inner surfaces of the upper and lower parallel members 12 and 14 and of the sidewalls 20 and 22.

Similarly, the control chamber 50 is bounded by outer surface 53 of the end section 43 of the stator member 42, end surface 54 of the leg portion 46 of the stator member 40, and the inner surface of the end member 16 of the housing 11, and by the exposed portions of the inner surfaces of the upper and lower parallel members 12 and 14 and of the sidewalls 20 and 22.

In the construction shown in FIGS. 1 to 4, the vanes 34 are formed with bevelled end surfaces 55 so that, if the unit 10 is operated with the rotor body 32 rotating in the opposite direction to the arrow C (FIG. 2), movement of the vanes 34 from the inner surfaces of the leg portions 46, 47 of the stator members 40, 42 respectively as at 57 onto the inner surface of the respective end section 43, 41 is facilitated.

It is further to be noted that the control chambers 48 and 50 are adapted to receive and discharge fluid under pressure so that the relative positions of the stator members 40 and 42 and in turn the eccentricity and volume of the stator chamber 44 may be controlled. In the particular construction illustrated, such fluid is supplied to and discharged from the control chambers 48 and 50 through fluid conduits 56 and 58 respectively. As will be explained in greater detail hereinafter, the conduits 56 and 58 may advantageously be connected in fluid communication outside the unit 10. Alternatively, they may be coupled together within the unit 10.

The unit 10 of FIGS. 1 to 4 is essentially completed by port systems for the supply and discharge of fluid to and from the stator chamber 44. The particular embodiment of a fluid pressure unit illustrated in the drawings is provided in accordance with a useful feature of the invention with four port systems indicated generally in FIG. 2 at 60, 61, 62 and 63 equiangularly disposed about the axis of the rotor shaft 24. As will be explained in greater detail hereinafter with reference to the operation of the unit 10, the diametrically opposed port systems 60 and 62 may function as fluid supply ports while the diametrically opposed intervening ports 61 and 63 may be used as fluid discharge ports. The port system illustrated is particularly useful in that it reduces radical stresses on the rotor.

Before describing the particular structure of these several port systems, it should first be noted that, for the unit 10 illustrated, the sidewall 22 is a two-part structure comprising an inner plate 64 and an outer plate 66. These plates 64 and 66 are provided with central openings in which the rotor shaft 24 is journalled by the bearing 27. In particular, it is to be noted that these plates 64 and 66 engage the outer race 67 of the bearing 27 with individual rollers 68 disposed conventionally between the outer race 67 and the inner race 31. A resilient oil seal 69 is disposed between the axial inner surface of the outer race 67 and the rotor body 32. Similarly, the opposite sidewall 20 engages outer race 70 of the bearing 26 with individual rollers 71 disposed conventionally between the outer race 70 and the inner race 29, a resilient oil seal 72 being disposed between the axial inner surface of the outer race 70 and the rotor body 32. It will also be appreciated that the roller bearings 26 and 27 may be replaced by other suitable bearings.

Figure 3:
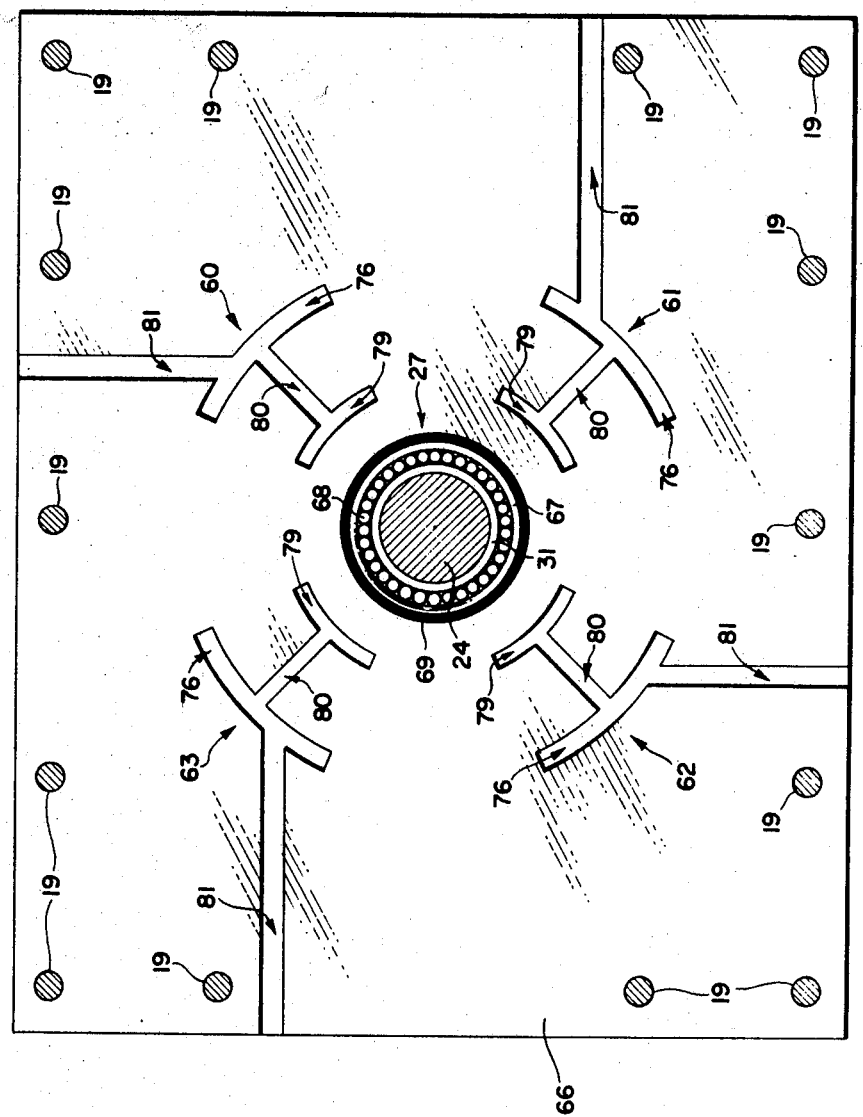
FIG. 3 is a similar radial sectional view to that of FIG. 2 but taken along the line 3—3 of FIG. 1.
Figure 4:
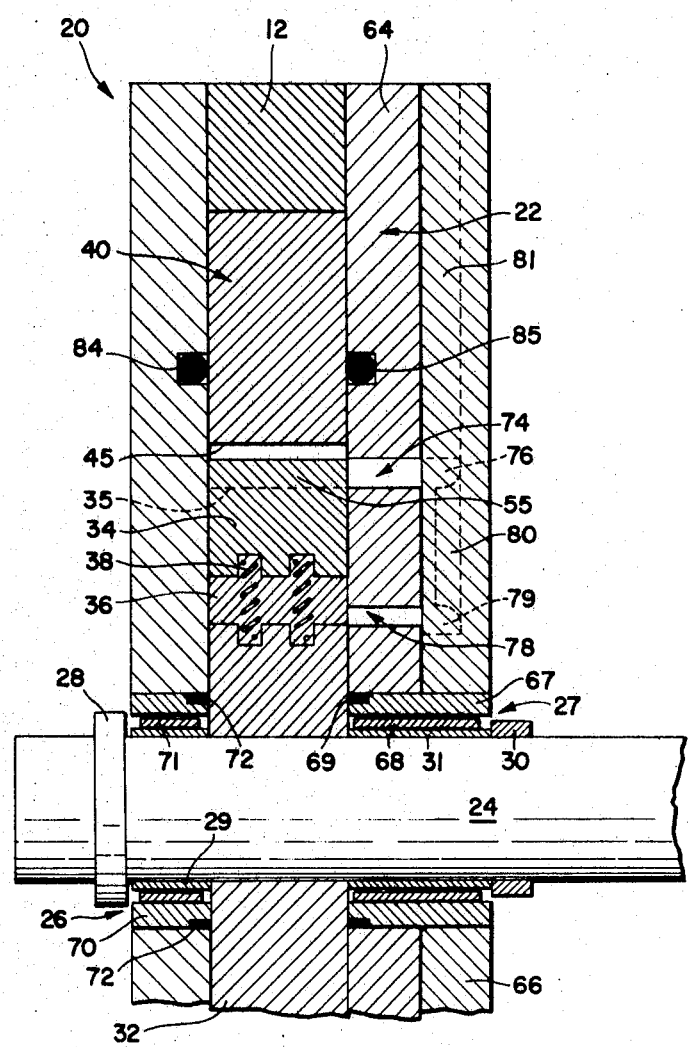
FIG. 4 is a partial axial sectional view through the unit of FIG. 1 taken along the line 4—4 of FIG. 2.

Referring further now to the port systems, 60, 61, 62 and 63, it will be noted that each of these port systems comprises a number of holes 74 extending in the axial direction through the inner plate 64. The holes 74 for each port system are disposed along an arc of a circle drawn about the axis of the rotor shaft 24 with all the holes 74 externally adjacent the peripheral surface 35 of the rotor body 32. Referring now to FIGS. 3 and 4, it will be seen that the axially outer end of each hole 74 of each of the port systems 60, 61, 62 and 63 opens into a respective outer, arcuate groove 76 provided in the axially inner surface of the outer plate 66. For a reason which will become apparent as the description herein proceeds, each set of holes 74 is associated with an inner arcuate set of holes 78 extending in the axial direction through the inner plate 64 and disposed in radial alignment with the inner ends of the vane-receiving slots 36. The outer ends of the holes 78 of each set open into a respective inner, arcuate groove 79. The outer and inner holes 74 and 78 respectively of each of the port systems 60, 61, 62 and 63 are in fluid communication with each other by virtue of the provision of a radially oriented groove 80 interconnecting the associated grooves 79 and 76. It will further be seen from FIG. 3 that each of the grooves 76 is provided with a fluid feed or discharge groove 81 extending to the outer edge of the sidewall 22. The several feed or discharge grooves 81 may be appropriately coupled together outside the unit 10 or channels or grooves (not shown) may be provided within the sidewall 22 for this purpose.

Figure 2:
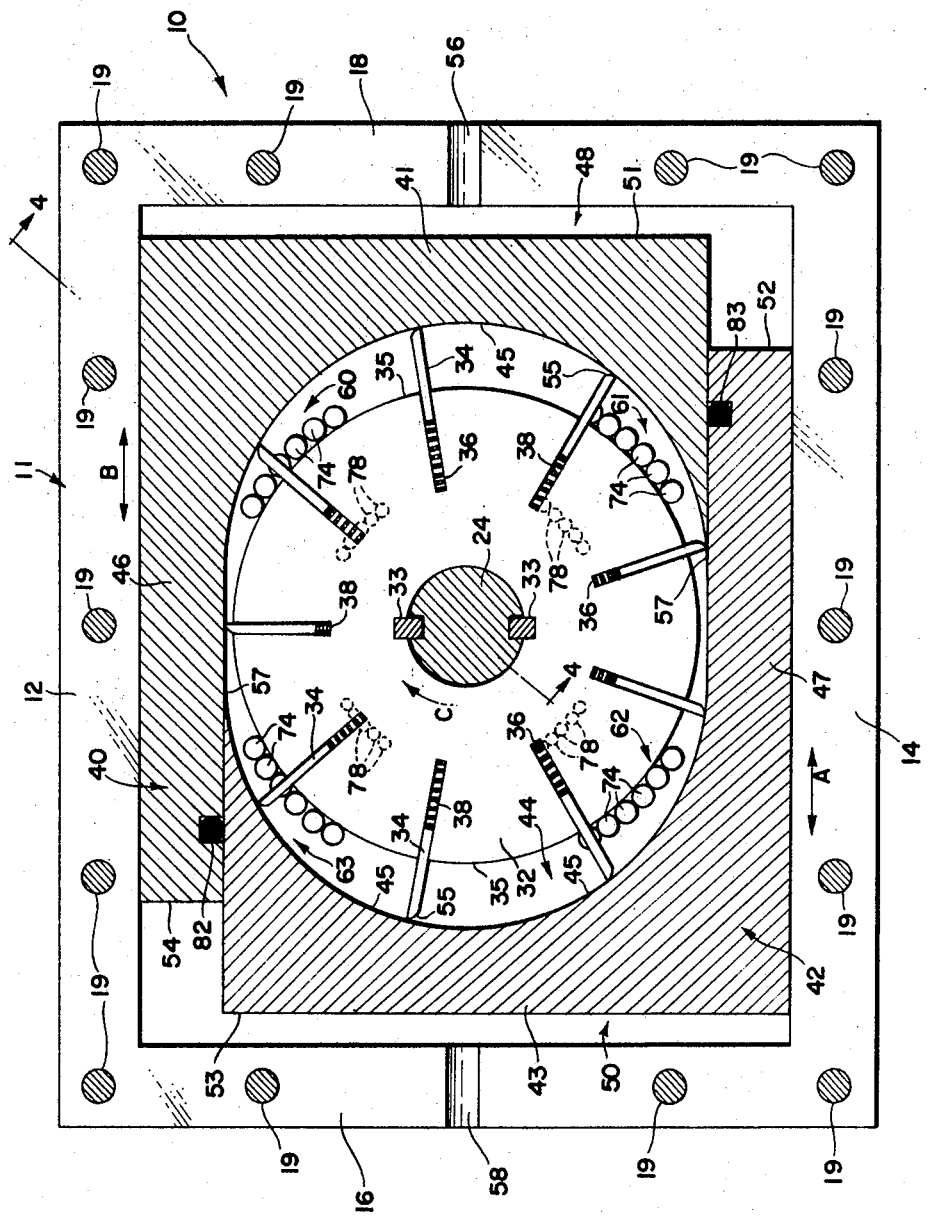
FIG. 2 is a radial sectional view through the unit of FIG. 1 taken along the line 2—2 of that figure.

Referring further to FIG. 2, it will be seen that resilient oil seals 82 and 83 are provided between the abutting surfaces of the leg portions 46 and 47 of the stator members 40 and 42 respectively to prevent undesired flow of fluid between the stator chamber 44 and the control chambers 50 and 48 respectively. Further sealing for the same purpose is provided by seals 84 and 85 disposed between the stator members 40 and 42, on the one hand, and the sidewalls 20 and 22 respectively, on the other hand (FIG. 1).

As previously indicated, the fluid pressure unit 10 may be utilized either as a motor or as a pump. In the former case, fluid under pressure is fed through the associated feed grooves 81, for example, to the diametrically opposed port systems 60 and 62 which will hereinafter be referred to as inlet ports. Such fluid will flow to these inlet ports from the associated grooves 81 through the grooves 76 to the holes 74. Similarly, the port systems 61 and 63 will function as discharge ports and, in this case, the fluid will flow from the appropriate parts of the stator chamber 44 through the holes 74, into the associated grooves 76 and then outwardly through the respective grooves 81.

In use, pressurized fluid will also flow through conduits 56 and 58 to and from the control chambers 48 and 50 respectively so as to act on the outer surfaces 51 and 53 of the stator members 40 and 42 respectively and on the end surfaces 52 and 54 of the leg portions 47 and 46 respectively of the stator members 42 and 40 respectively. Considering the stator members 40 and 42 in the relative positions shown in FIG. 2, it will be appreciated that the eccentricity of the stator chamber 44 will cause the rotor body 32 to be driven in the direction of the arrow "C." With further reference of FIG. 2, it will be noted that the vanes 34 are disposed so as to isolate the inlet ports 60 and 62 from the discharge ports 61 and 63 as is well known to those skilled in the art.

In operation, the vanes 34 are urged radially outwardly by their associated springs 38 so as to terminally engage the cam surface 45 of the stator chamber 44. It might conveniently be noted at this stage that, since the unit 10 is provided with an uneven number of equiangularly disposed vanes 34, at any time only one vane will be traversing the boundary line between the stator members 40 and 42. This is effective in reducing undesirable vibrations. The flow of fluid through the radial grooves 80 into the respective inner, arcuate grooves 79 permits the flow of fluid to and from the slots 36 radially inwardly of the vanes 34 to permit in turn the radial sliding movement of the vanes 34 with respect to the rotor body 32. Assuming that the hydraulic forces applied to the stator members 40 and 42 remain constant, the motor 10 will operate at a substantially constant speed and the stator members 40 and 42 will remain in the relative positions illustrated. If, however, the load on the rotor shaft 24 is reduced, the torque output of the unit can be reduced by feeding additional fluid to the control chambers 48 and 50 to cause the stator members 40 and 42 to move towards each other so causing the vanes 34 to be retracted somewhat into the rotor body 32. It will be appreciated that the fluid pressure applied to the conduits 56 and 58 may be controlled automatically in response to the torque developed by the motor 10 to provide automatic adjustment of the relative positions of the stator members 40 and 42. One procedure for doing this will now be described in greater detail, merely by way of example, with reference to the fluid pressure system illustrated in FIG. 5. It should be noted that in FIG. 5 the fluid lines to the input and discharge ports 60, 61, 62 and 63 are shown somewhat schematically at 90, 91, 92 and 93 respectively.

Referring now in greater detail to the system shown in FIG. 5 in which the unit 10 is arranged to operate as a non-reversible hydraulic motor, it will be seen that the fluid lines 90 and 92 for the supply of hydraulic fluid under controlled pressure to the motor 10 are coupled to a single fluid supply line 94, the fluid flow through this line being controlled by a suitable throttle valve 95. Fluid under pressure is fed to the throttle valve 95 from a hydraulic pump 96 through line 97. A main shut-off valve 98 is provided in the line 97 and an accumulator 99 is connected to line 97 to maintain the supply pressure at a substantially constant value. The pump 96 is driven by any suitable motive power source (not shown) to pump hydraulic fluid 100 from a reservoir 101. After passing through the motor 10, the hydraulic fluid passes through the individual discharge lines 91 and 93 to a main discharge line 102 through which it is returned to the reservoir 101.

The conduits 56 and 58 for the control chambers 48 and 50 respectively are connected by fluid lines 103, 104 and 105 to one port of a three-way valve 106. Valve 106 is controlled by a differential, pressure-responsive valve shown somewhat schematically at 107. This valve 107 is connected by lines 108, 109 and 110 across the throttle 95 so as to be responsive to variation of fluid pressure in the input line 94. The system is also provided with a line 111 connected between the line 110 and a port 112 of the valve 106 so as to supply hydraulic fluid at the aforementioned predetermined pressure (as in the accumulator 99) to the control chambers 48 and 50 when the valve 106 is operating as actually shown in FIG. 5. The valve 106 is also provided with a neutral position 113 in which the flow of hydraulic fluid to and from the control chambers 48 and 50 is prevented, and with a third position 114 in which hydraulic fluid may be discharged from the control chambers 48 and 50 to line 115 and then to the reservoir 101.

The system hereinbefore described with reference to FIG. 5 is designed to provide an automatically controlled, variable torque output at the rotor shaft 24. In the event that, for a given throttle setting, the load on the motor 10 decreases, the hydraulic pressure in the line 94 will decrease. This pressure change will cause the piston 116 of the valve 107 to move to the position actually shown in FIG. 5 and this, in turn, will permit hydraulic fluid to flow through lines 110 and 111, valve 106 and lines 105, 103 and 104 to the control chambers 48 and 50. The increased pressure in these chambers will then cause the stator members 40 and 42 to move towards each other to reduce the eccentricity of the stator chamber 44 and consequently automatically to reduce the torque output of the motor 10. Such movement of the stator members 40 and 42 will continue until the pressure in the line 94 has risen to a predetermined value and, at that time, the valve 107 will cause the valve 106 to be moved to its neutral position (113). Similarly, if the load on the motor 10 increases, the pressure in the line 94 will increase and this will actuate valve 107 to move valve 106 to permit the discharge of hydraulic fluid from the control chambers 48 and 50 to the reservoir 101. Consequently, the relative separation of the stator members 40 and 42 will also increase. The resulting greater eccentricity of the stator chamber 44 results in the desired increased torque output of the motor 10.

The provision of a shut-off valve 117 in the fluid discharge line 102 is useful for braking the motor 10.

Although the motor 10 has been described with reference to FIG. 5 for non-reversible operation, will be appreciated that, by using the lines 91 and 93 as fluid input lines and the lines 90 and 92 as fluid discharge lines, it may be operated in the reverse direction. For this purpose, a suitable reversing valve may be provided for the lines 94 and 102. In this case, it will be desirable to include a suitable check valve between each of the lines 94 and 102 and the differential pressure-responsive valve 107 so that the latter valve is only actuated in response to the pressure in the operative input line.

As previously indicated, the unit 10 may also be operated as at hydraulic pump. In such a case, a suitable motive power source is coupled to the rotor shaft 24. Lines 90 and 92 could then serve, for example, as fluid suction lines with lines 91 and 93 serving as pressurized fluid discharge lines. In this case, the variable pressure applied to the differential valve or other sensing means controlling the supply and discharge of pressurized fluid to the control chambers 48 and 50 could be the pressure existing in the fluid discharge line.

In the use of the unit 10 as a pump, it may be possible to dispense with the springs 38 and to rely on centrifugal force to maintain the vanes 34 in their radially extended positions so that they are always in terminal engagement with the cam surface of the stator chamber 44.

Although the units of the invention have been described as incorporating stationary stators with rotating rotors, it should further be understood that the rotor body 32 of the unit 10 of FIGS. 1 to 4 may, if desired, be maintained stationary and the housing 11 and the stator members 40 and 42 designed so as to rotate during operation of the unit. When used herein, the terms "rotor" and "stator" are to be interpreted as embracing both such possibilities.

Various modifications can be made within the scope of the inventive concept which is disclosed and/or claimed. Accordingly, it is intended that what is set forth herein should be regarded as illustrative of such concept and not for the purpose of limiting protection to any particular embodiment thereof, and that only such limitations should be placed upon the scope of proection to which the inventor hereof is entitled, as justice dictates.

What is claimed is:

1. A fluid pressure unit comprising a housing, a pair of axially separated sidewalls, a generally cylindrical rotor journalled in said sidewalls and having a plurality of circumferentially spaced apart vanes movably received within corresponding slots extending generally radially inwardly from the periphery of said rotor, and a pair of stator members each slidably disposed in mutually overlapping relationship within said housing with respect to each other between said sidewalls to define a stator chamber having an inner continuous cam surface containing said rotor, said cam surface being engaged terminally by said vanes and said stator members defining with said housing diametrically opposed control chambers adapted to receive fluid under pressure for the purpose of controlling the relative positions of said stator members and in turn the eccentricity and volume of said stator chamber, and ports for the supply and discharge of fluid to and from said stator chamber, said ports being spaced apart sufficiently to be isolated from one another by said vanes.

2. A fluid pressure unit as defined in claim 1 comprising a pair of generally diametrically opposed supply ports for the supply of fluid to said stator chamber and a pair of generally diametrically opposed discharge ports for the discharge of fluid from said stator chamber whereby, in operation, radial stresses on said rotor are substantially reduced.

3. A fluid pressure unit as defined in claim 2 in which said vanes are normally urged radially outwardly by spring means disposed within said slots radially inwardly of said vanes.

4. A fluid pressure unit as defined in claim 1 in which said control chambers are adapted to be in fluid communication with each other.

5. A fluid pressure unit as defined in claim 1 which comprises an odd number of said vanes, which vanes are equiangularly spaced with respect to each other.

6. A fluid pressure system comprising a source of pressurized fluid at a predetermined pressure, a fluid pressure unit compising a generally cylindrical rotor journalled in a housing and having a plurality of circumferentially spaced apart vanes movably received within corresponding slots extending generally radially inwardly from the periphery of said rotor, a deformable stator defining a stator chamber having an inner cam surface and containing said rotor, said cam surface being engaged terminally by said vanes, a supply port for the supply of fluid from said source to said stator chamber and a discharge port for the discharge of fluid from said stator chamber, said supply port and said discharge port being spaced apart sufficiently to be isolated from one another by said vanes, and at least one fluid pressure control chamber in external pressure communication with said deformable stator whereby the eccentricity of said stator chamber is varied in dependence on the fluid pressure existing in said control chamber, sensing means for sensing the pressure at one port selected from said supply port and said discharge port, and control means associated with said sensing means for controlling the supply of pressurized fluid from said source to said control chamber and out of said control chamber in accordance with the value of said pressure at said one port whereby the eccentricity of said stator chamber is automatically adjusted so as to maintain a predetermined pressure at said one port.

7. A fluid pressure system as defined in claim 6 in which said sensing means comprises a differential valve adapted to control said control means in accordance with the instantaneous value of the ratio of said pressure at said one port and the pressure at said source of pressurized fluid.

8. A fluid pressure system as defined in claim 6 in which said fluid pressure unit comprises a hydraulic motor, in which said source of pressurized fluid is in fluid communication with said supply port through a fluid line including a throttle means, in which said sensing means comprises a differential valve connected across said throttle means, and in which said control means comprises a three-way valve adapted controllably under the control of said differential valve to permit the flow of pressurized fluid from said source to said control chamber, or to prevent the flow of fluid to and from said control chamber, or to permit the discharge of fluid from said control chamber, whereby the pressure at said one port is maintained substantially constant irrespective of the value of the load applied to said motor.

9. A fluid pressure system as defined in claim 6 in which said fluid pressure unit comprises a hydraulic pump, in which said sensing means comprises a differential valve connected between said discharge port and said source of presusrized fluid, and in which said control means comprises a three-way valve adapted controllably under the control of said differential valve to permit a flow of pressurized fluid from said source to said control chamber, or the discharge of fluid from said control chamber, or to prevent the flow of fluid to and from said control chamber, whereby fluid is discharged from said discharge port at a substantially constant pressure.

10. A fluid pressure system as defined in claim 6 in which said fluid pressure unit comprises a housing, a pair of axially separated sidewalls, a generally cylindrical rotor journalled in said sidewalls and having a plurality of circumferentially spaced apart vanes movably received within corresponding slots extending generally radially inwardly from the periphery of said rotor, and a pair of stator members each slidably disposed in mutually overlapping relationship within said housing to define a stator chamber having an inner continuous cam surface containing said rotor, said cam surface being engaged terminally by said vanes and said stator members defining with said rousing diametrically opposed control chambers adapted to receive fluid under pressure for the purpose of controlling the relative positions of said stator members and in turn the eccentricity and volume of said stator chamber, and ports for the supply and discharge of fluid to and from said stator chamber, said ports being spaced apart sufficiently to be isolated from one another by said vanes.

11. A fluid pressure system as defined in claim 10 in which said fluid pressure unit comprises a pair of generally diametrically opposed supply ports for the supply of fluid to said stator chamber and a pair of generally diametrically opposed discharge ports for the discharge of fluid from said stator chamber whereby, in operation, radial stresses on said rotor are substantially reduced.

12. A fluid pressure system as defined in claim 11 in which said vanes of said fluid pressure unit are normally urged radially outwardly by spring means disposed within said slots radially inwardly of said vanes.

13. A fluid pressure system as defined in claim 10 in which said control chambers of said fluid pressure unit are adapted to be in fluid communication with each other.

14. A fluid pressure system as defined in claim 10 in which said fluid pressure unit comprises an odd number of said vanes, which vanes are equiangularly spaced with respect to each other.

References Cited

UNITED STATES PATENTS

| | | | |
|---|---|---|---|
| 2,016,315 | 10/1935 | Calzoni | 103—120(PA) |
| 2,170,786 | 8/1939 | McElroy et al. | 103—120(PA) |
| 2,631,544 | 3/1953 | Wilcox | 103—120(PA) |
| 2,804,017 | 8/1957 | Wirz | 103—120(PA) |
| 3,083,535 | 4/1963 | Krafft et al. | 103—120(PA) |
| 3,407,742 | 10/1968 | Mitchell et al. | 103—120(PA) |

CARLTON R. CROYLE, Primary Examiner

W. J. GOODLIN, Assistant Examiner

U.S. Cl. X.R.

418—31